United States Patent [19]

Greiner et al.

[11] 4,333,304
[45] Jun. 8, 1982

[54] ADJUSTABLE CROP GUIDE APPARATUS

[75] Inventors: James G. Greiner, Leola; Joseph J. Lehman, New Holland; Edward H. Priepke, Lancaster, all of Pa.

[73] Assignee: Sperry Corporation, New Holland, Pa.

[21] Appl. No.: 247,963

[22] Filed: Mar. 26, 1981

[51] Int. Cl.³ .............................................. A01D 45/00
[52] U.S. Cl. ............................................. 56/119; 56/98
[58] Field of Search ..................................... 56/98, 119

[56] References Cited

U.S. PATENT DOCUMENTS

| | | | |
|---|---|---|---|
| 3,018,601 | 1/1962 | Griffin | 56/119 |
| 3,139,718 | 7/1964 | Rickerd et al. | 56/119 |
| 3,352,093 | 11/1967 | Procter | 56/119 |
| 3,791,117 | 2/1974 | Lawrence | 56/98 |
| 3,796,029 | 3/1974 | Weigand et al. | 56/119 |
| 4,037,393 | 7/1977 | Anderson | 56/119 |
| 4,048,792 | 9/1977 | Shriner | 56/98 |
| 4,086,749 | 5/1978 | Greinier et al. | 56/98 |
| 4,214,422 | 7/1980 | McMillen | 56/119 |
| 4,296,593 | 10/1981 | Webb et al. | 56/119 |

*Primary Examiner*—Paul J. Hirsch
*Attorney, Agent, or Firm*—James R. Bell; Frank A. Seemar

[57] ABSTRACT

A row crop attachment has row crop dividers which are independently adjustable for varying widths of row crops. Protruding crop guide members which are mounted for width adjustment with the dividers are also adjustable independently of the dividers and the guide members are relatively adjustable for both width and height adjustment.

12 Claims, 7 Drawing Figures

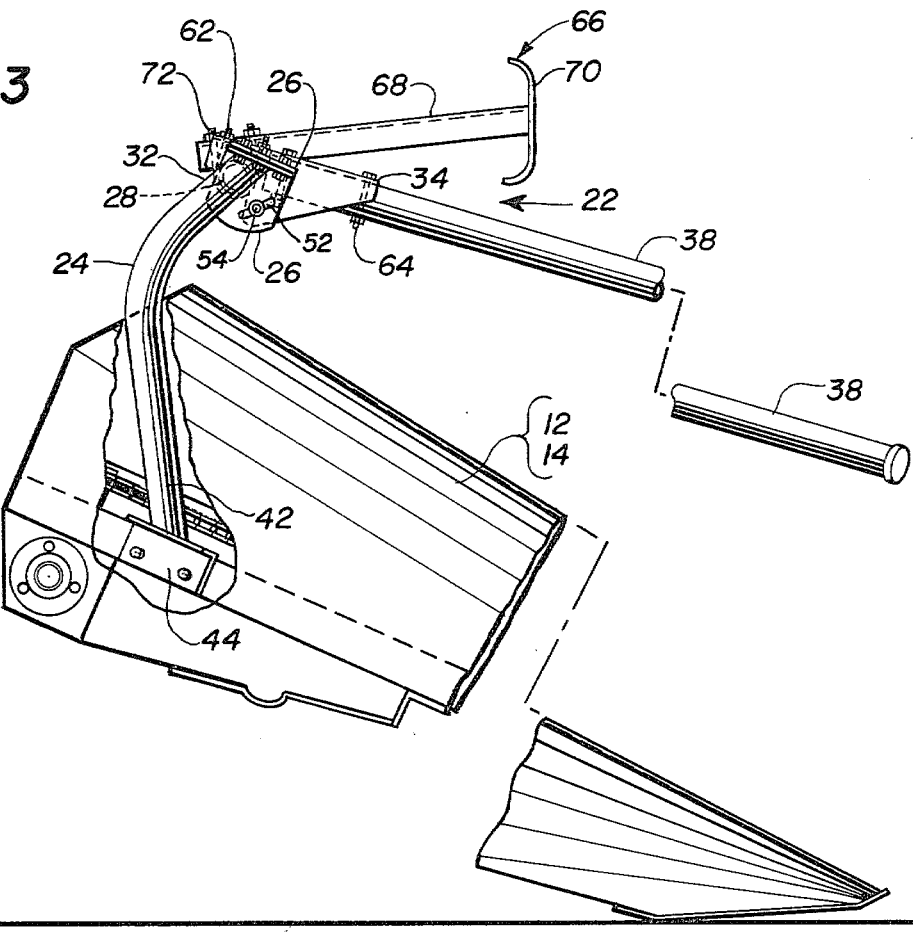
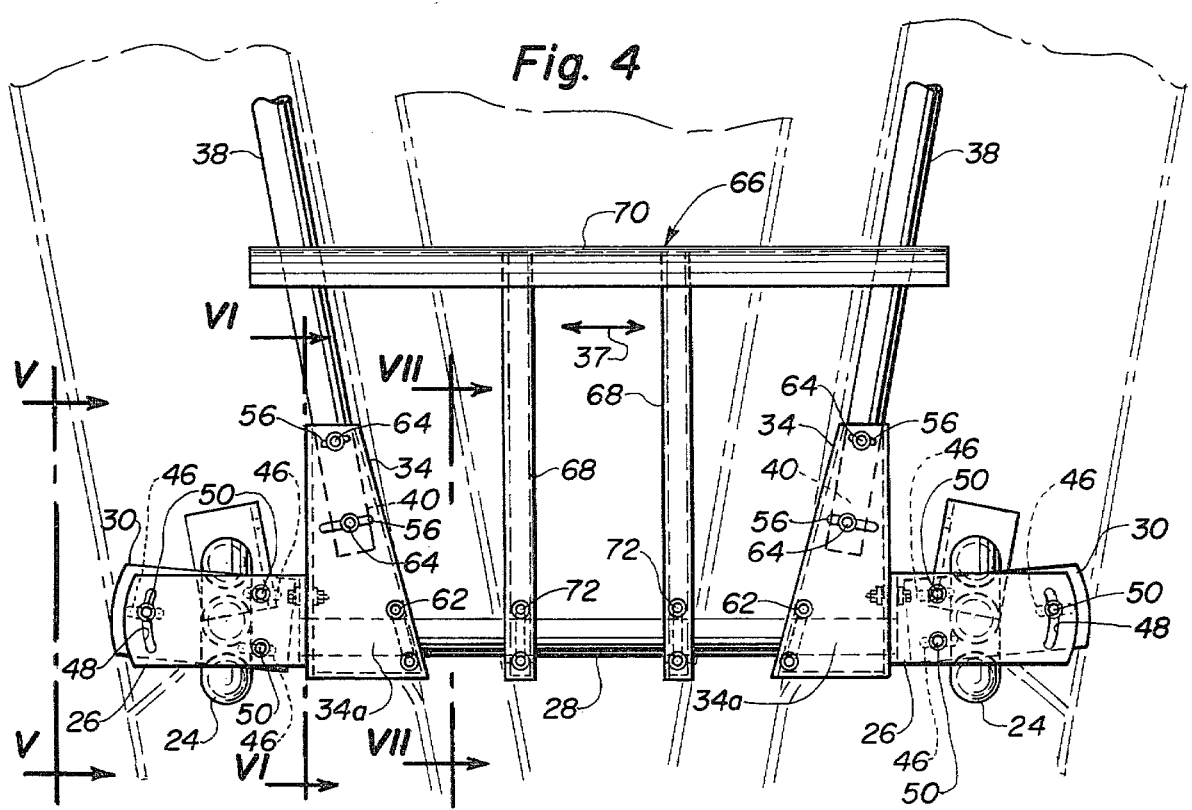

ADJUSTABLE CROP GUIDE APPARATUS

BACKGROUND OF THE INVENTION

This invention relates generally to harvesters and more particularly to the corn stalk type having gatherers or guides.

Harvesting attachments and especially those relating to row crops such as corn, having recently been provided with independently adjustable row crop dividers. These attachments are often provided with crop guiding members, some of which extend outwardly and somewhat resemble a pair of horns of the type which extend from the head of a cow or bull. The purpose of these guiding members is to guide the upper portion of the corn stalk while the lower portion of the stalk is being gathered and cut by the attachment.

Presently known guide members are fixed to the crop dividers and are movable with them but a limitation is that these guide members are not capable of being adjusted independently of the crop dividers.

The foregoing illustrates a limitation of the known prior art. Thus, it is apparent that it would be advantageous to provide an alternative directed to overcoming one or more of the limitations as set forth above.

Accordingly, a suitable alternative would be to provide crop guide members which are adjustable independently of the crop dividers and preferably are independently adjustable both in their relative width and height.

SUMMARY OF THE INVENTION

In one aspect of the present invention, there is accomplished by providing an adjustable crop guide apparatus including a support member. A bracket is attached to the support and is movable in a first direction relative to the support. A crop guide member has one end connected to the bracket for movement therewith in the first direction and is connected so that the guide member can be moved in a second direction relative to the support; the second direction being substantially perpendicular to the first direction.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 3 is a side elevational view illustrating an embodiment of the apparatus of this invention;

FIG. 4 is a partial plan view illustrating an embodiment of the apparatus of this invention;

DESCRIPTION OF THE PREFERRED EMBODIMENT

Figure 1:
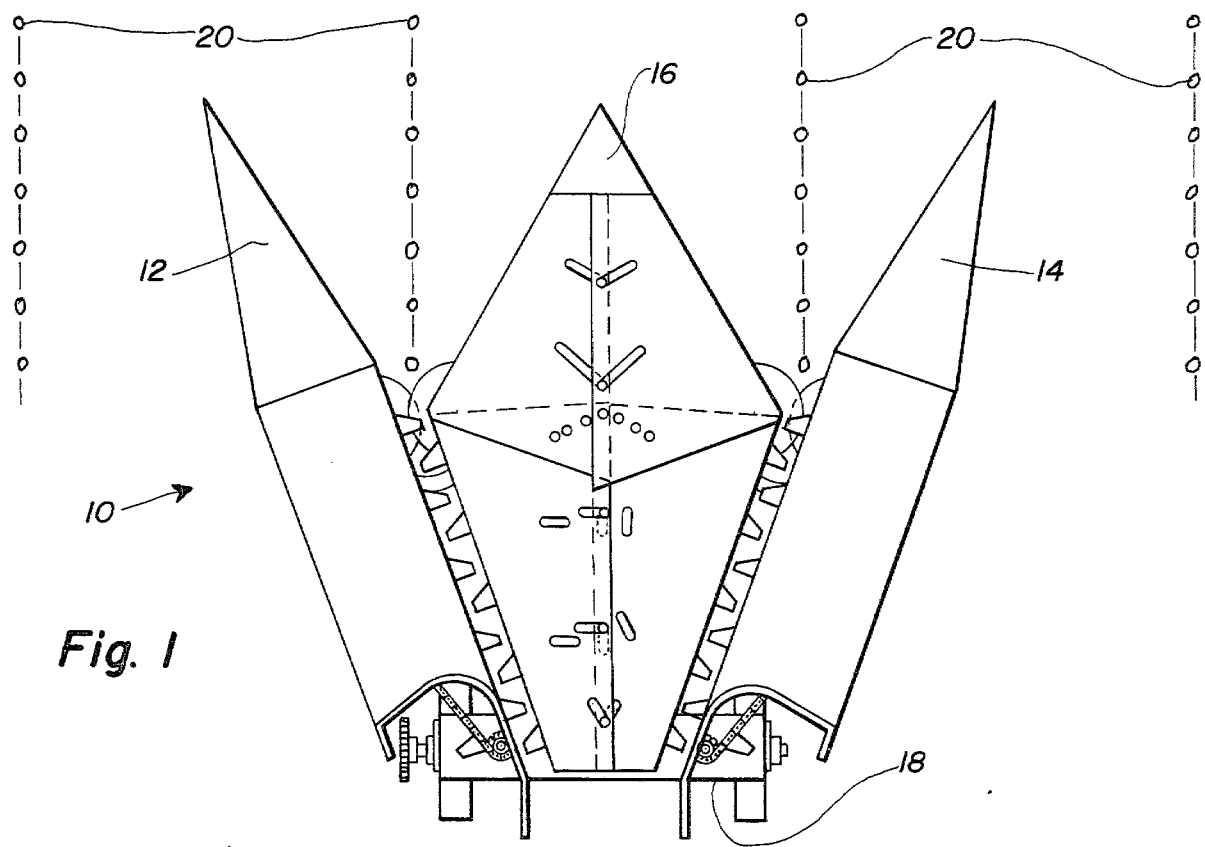
FIG. 1 is a plan view illustrating an embodiment of a width-adjustable row crop attachment set for accommodating crop rows of a first width.
Figure 2:
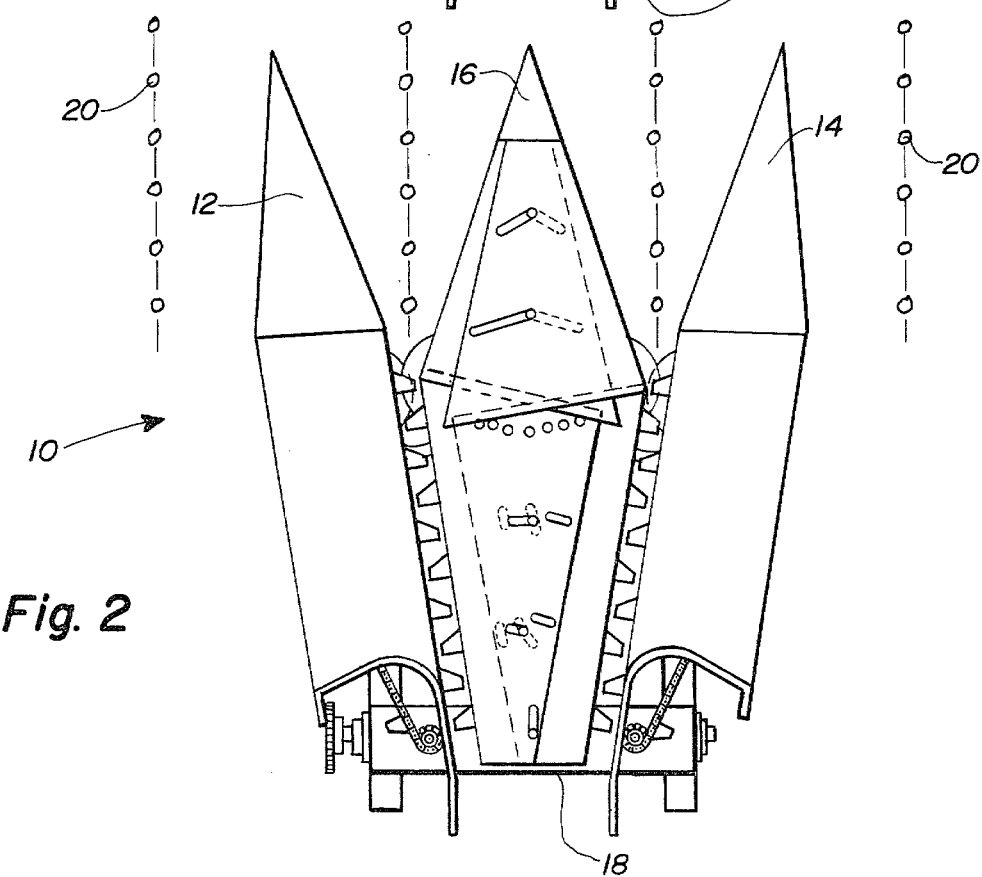
FIG. 2 is a plan view illustrating an embodiment of the width-adjustable row crop attachment of FIG. 1, set for accommodating crop rows of a second narrower width.
Figure 5:
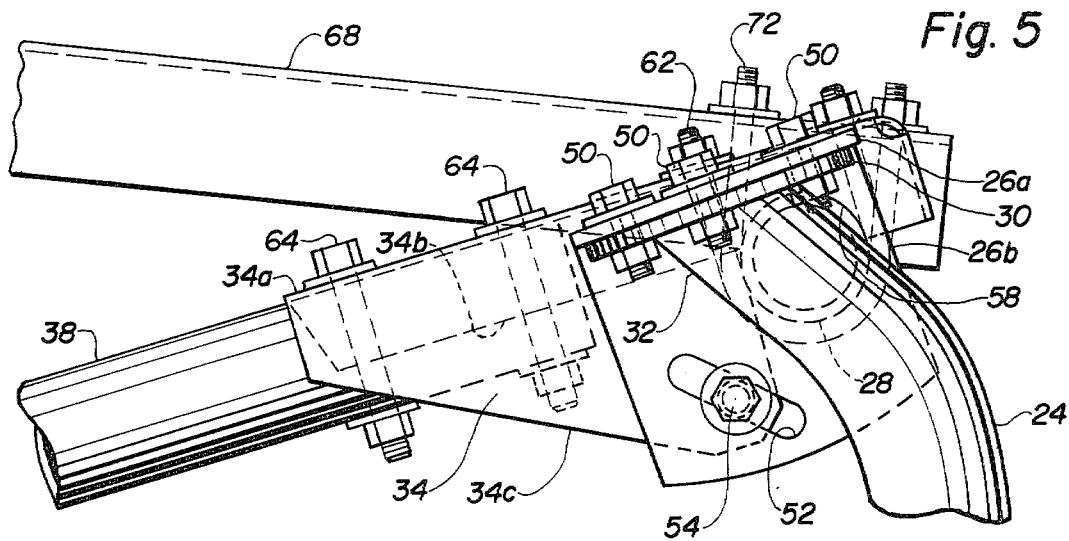
FIG. 5 is a partial side elevational view illustrating an embodiment of the apparatus of this invention viewed from line V—V of FIG. 4.

FIGS. 1 and 2 illustrate a known adjustable harvesting attachment generally designated 10 of the type known as a two-row row crop attachment. Attachment 10 includes a first row crop divider 12 and a second row crop divider 14 separated by a third row crop divider 16. These dividers are movably mounted on a frame 18 so that the first and second row crop dividers 12,14, respectively, can be pivoted toward and away from each other and the third crop row divider 16 can be made wider or narrower as illustrated in FIGS. 1 and 2. Thus, it is apparent that such attachments are adjustable to accommodate varying row widths of row crop 20.

Figure 6:
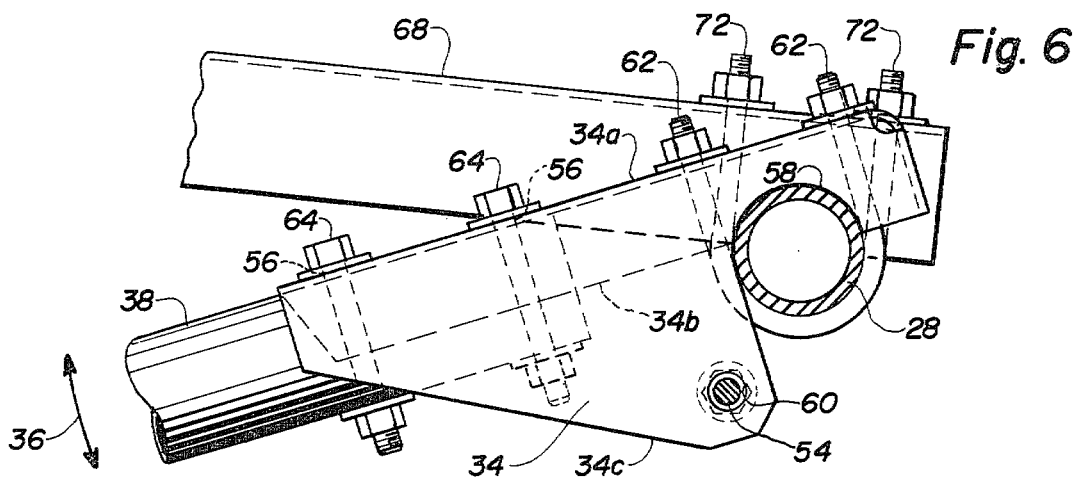
FIG. 6 is a partial side elevational view illustrating an embodiment of the apparatus of this invention viewed from line VI—VI of FIG. 4.

An adjustable crop guide apparatus generally designated 22 is provided for use with attachment 10. Apparatus 22, shown in FIGS. 3 through 7, includes a support member which comprises first and second support posts 24 and means adjustably interconnecting the first and second support posts. The means adjustably interconnecting the posts includes a pair of plates 26 interconnected by a support bar 28. Each post has a slotted flange 30 connected at one end 32 thereof and plates 26 are slotted and attached to the flanges 30. Bracket means 34 are attached by adjustable means to the support bar 28 and are provided for movement in a first or vertical direction indicated by arrow 36 (FIG. 6) and second or horizontal direction indicated by arrow 37 (FIG. 4). The first direction 36 and the second direction 37 are therefore substantially perpendicular to each other. Crop guide means 38 have one end 40 connected by adjustable means to bracket means 34 for movement therewith in the first 36 and second 37 directions and for independent movement in the second direction 37 relative to the bracket means 34.

More specifically now, FIGS. 3 through 7 illustrates the adjustable crop guide apparatus 22 as generally described above. Since support posts 24 are similar tubular support post 24 includes a first end 42 having a steel bracket 44 preferably welded thereto. The bracket 44 is preferably bolted to one of the pivotal row crop dividers 12,14. Second end 32 of post 24 has steel flange 30 preferably welded thereto. Flange 30 includes a plurality of slots 46. Steel support bar 28 has steel plates 26 preferably welded to each end thereof. Plates 26 include at least one slot 48. Thus, with a plurality of slots 46 provided in flanges 30 which are attached to the posts 24, and a slot 48 provided in plates 26 which are connected to support bar 28, adequate adjustment of posts 24 relative to support bar 28 can be made. This is accomplished when posts 24 are moved toward and away from each other as a result of row crop divider members 12,14 being moved toward and away from each other. A plurality of adjustment means such as bolts 50 inserted through the slots 46,48 can secure the support bar 28 in a desired position. Plate 26 is generally of an L-shaped configuration (FIG. 5) having a first portion 26a including slot 48 for mating alignment with the slots 46 in flanges 30, and a second portion 26b to which is attached the support bar 28. Second portion 26b also includes a slot 52 for attaching plate 26 to bracket 34 by means of an adjustable means such as a bolt 54.

Generally, bracket 34 includes a main support frame 34a and a pair of spaced side portions 34b,34c. The main support portion 34a includes a plurality of apertures 56,58 for receiving adjustable means such as bolts. Some of the apertures 56 are slotted. Both of the side plates 34b,34c include a recess 58 for receiving support bar 28 and one of the side portions 34c includes an aperture 60 for bolting the bracket 34 to the plate 26. A U-bolt 62 is preferably used to connect the bracket to the support bar. U-bolt 62 extends around support bar 28 and upwardly through the main support portion 34a of bracket 34 where it is bolted into position. Adjustment of U-bolt 62 provides the means for adjustably fastening bracket 34 to support bar 28.

The crop guide means 38 includes a pair of elongated steel tubular members having one end 40 connected to bracket 34 by means of a pair of bolts 64 extending through slots 56 in the upper main support portion 34a of the bracket 34 and downwardly through the one end 40 of the crop guide means 38. This provides a means for adjustably fastening the crop guides 38 to the bracket 34.

Figure 7:
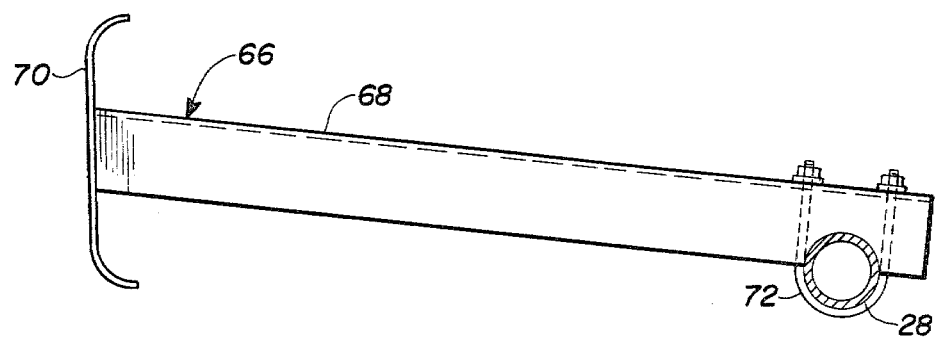
FIG. 7 is a partial side elevational view illustrating an embodiment of the apparatus of this invention viewed from line VII—VII of FIG. 4.

A cross bar apparatus 66, FIGS. 3 and 7, is provided for blocking and limiting further rearward movement of upper portions of the stalks of the row crop 20. Cross bar apparatus 66 includes a pair of tubular members 68 interconnected by a plate 70 welded thereto and the tubular members 68 are each connected to the support bar 28 by a U-bolt 72, thus making the cross bar apparatus 66 adjustable to accommodate the varying height of crops 20.

With the parts assembled as set forth above, it can be seen that pivotal movement of the row crop dividers 12,14 toward and away from each other makes it possible to move the posts 24 toward and away from each other by virtue of the adjustable relationship between the flanges 30, the plates 26 and the support bar 28. It can also be seen that the crop guide members 38 are adjustable independently of movement of the crop dividers 12,14 and are independently adjustable both in their relative width and height. As a result, movement of the independently adjustable row crop dividers 12,14 to accommodate the varying row widths of the row crop 20 can be complimented by adjustment of the crop guide members 38 both as to their relative width and height thereby accommodating a variety of row crop widths and heights.

The foregoing has described crop guide members which are adjustable independently of the row crop dividers and preferably are independently adjustable both in their relative width and height. It is anticipated that an equivalent apparatus could use a ball and socket device, or the like, to accomplish substantially the same adjustment capabilities as is done with the apparatus claimed in this invention.

It is anticipated that aspects of the present invention other than those specifically defined in the appended claims can be obtained from the foregoing description and the drawings.

Having thus described the invention, what is claimed is:

1. An adjustable crop guide apparatus comprising:
   a support member including a first support post, a second support post, and means adjustably interconnecting said first and second posts;
   bracket means attached to said support for movement in a first and second direction relative to said support, said second direction being substantially perpendicular to said first direction; and
   crop guide means having one end connected to said bracket for movement therewith in said first and second directions and for independent movement in said second direction relative to said bracket.

2. The apparatus of claim 2 wherein said means adjustably interconnecting said posts includes a pair of plates interconnected by a support bar.

3. The apparatus of claim 2 wherein said bracket means is connected to said means adjustably interconnecting said first and second posts.

4. The apparatus of claim 2 including:
   first means for adjustably fastening said bracket to said means adjustably interconnecting said first and second posts; and
   second means for adjustably fastening crop guide means to said bracket.

5. The apparatus of claim 2 wherein said first and second support posts each include a slotted flange attached at one end thereof.

6. The apparatus of claim 5 wherein said means adjustably interconnecting said posts includes a pair of slotted plates interconnected by a support bar.

7. The apparatus of claim 6 including:
   first means for adjustably fastening said bracket to said support bar; and
   second means for adjustably fastening said crop guide means to said bracket.

8. An adjustable crop guide apparatus comprising in combination:
   a crop harvesting attachment having row crop dividers,
   a support member connected to said attachment, said support member including a first support post, a second support post, and means adjustably interconnecting said first and second posts;
   a pair of bracket means attached to said support for independent movement in a first and second direction relative to said support, said second direction being substantially perpendicular to said first direction; and
   a crop guide means connected to each bracket, each crop guide means having one end connected to said bracket for movement therewith in said first and second directions and for independent movement in said second direction relative to said bracket.

9. The apparatus of claim 8 wherein said crop harvesting attachment includes independently adjustable row crop dividers.

10. The apparatus of claim 9 wherein said first support post is fixedly connected for movement with one of said adjustable row crop dividers, and said second support post fixedly connected for movement with another of said adjustable row crop dividers.

11. The apparatus of claim 10 including:
    first means for adjustably fastening said bracket to said means adjustably interconnecting said first and second posts; and
    second means for adjustably fastening said crop guide means to said brackets.

12. The apparatus of claim 8 wherein said harvesting attachment includes independently adjustable row crop dividers, said first support post is fixedly connected for movement with one of said adjustable row crop dividers, and said second support post is fixedly connected for movement with another of said adjustable row crop dividers, each post having a slotted flange attached at one end thereof, a slotted plate adjustably connected to each flange, a support bar interconnecting said slotted plates, first means for adjustably fastening said bracket to said support bar; and second means for adjustably fastening said crop guide to said bracket.

* * * * *